United States Patent [19]

Pope

[11] Patent Number: 4,474,951

[45] Date of Patent: Oct. 2, 1984

[54] HYDROXYALKYLATION OF POLYSACCHARIDES

[75] Inventor: Brian G. Pope, Baton Rouge, La.

[73] Assignee: The Dow Chemical Company, Midland, Mich.

[21] Appl. No.: 536,126

[22] Filed: Sep. 27, 1983

[51] Int. Cl.$^3$ .................... C08B 11/08; C08B 31/10; C08B 37/00

[52] U.S. Cl. .......................... 536/95; 536/2; 536/3; 536/111

[58] Field of Search .................. 536/95, 111, 2, 3

[56] References Cited

U.S. PATENT DOCUMENTS

| | | | |
|---|---|---|---|
| 2,819,260 | 1/1958 | Monson et al. | 536/1 |
| 2,819,261 | 1/1958 | Monson et al. | 536/2 |
| 2,854,447 | 9/1958 | Monson et al. | 536/95 |
| 2,854,449 | 9/1958 | Monson et al. | 536/111 |
| 2,931,753 | 4/1960 | Chesbro et al. | 536/111 |
| 3,963,434 | 6/1976 | Ward et al. | 8/120 |
| 4,015,067 | 3/1977 | Liu et al. | 536/95 |

FOREIGN PATENT DOCUMENTS 556556  4/1958  Canada ............................ 536/111

OTHER PUBLICATIONS

Srivastava et al., *Indian Journal of Chemistry*, 9, 1081–1082, (Oct. 1971).
Chemical Abstracts, vol. 75, No. 4, Jul. 26, 1971, Abstract 22754z.

Primary Examiner—Ronald W. Griffin
Attorney, Agent, or Firm—Norman L. Sims

[57] ABSTRACT

The invention is a process for the 2-hydroxyalkylation of a polysaccharide which comprises contacting a polysaccharide with an alkylene carbonate in the presence of a catalytic amount of a quaternary ammonium halide under conditions such that the polysaccharide undergoes hydroxyalkylation.

16 Claims, No Drawings

HYDROXYALKYLATION OF POLYSACCHARIDES

BACKGROUND OF THE INVENTION

This invention relates to a process for the hydroxyalkylation of polysaccharides.

In commercial processes starch is hydroxyethylated by the following procedure. A 0.5 percent by weight slurry of starch in water is contacted with acid to digest the starch so as to lower the molecular weight of the starch. Thereafter, the slurry is treated with a strong base, such as sodium hydroxide, to make the slurry basic. The slurry is then contacted with ethylene oxide and reacted for between about 17 and 22 hours at 40° C. Thereafter the slurry is neutralized. The hydroxyethylated starch can be removed from the water by filtration. The acid digestion step results in a product with a lower molecular weight than the original starch reactant. Ethylene oxide has the tendency to undergo polyethoxylation, making it difficult to prepare a monoethoxylated product. Furthermore, a large percentage of the ethylene oxide forms ethylene glycol as a by-product.

Srivastava et al., *Indian Journal of Chemistry*, 9, 1081 (1971), disclose three processes for hydroxyethylating glucose, starch and amylopectin. In one process described, D-glucose is hydroxyethylated with ethylene carbonate with sodium hydroxide as the catalyst. It is reported that the process gives poor hydroxyethylation efficiency. It is also disclosed that the use of metallic sodium as a catalyst and a polar solvent such as dimethylformamide gave satisfactory results at temperatures above 100° C. for the hydroxyethylation of glucose. The best process, according to the author, uses sodium hydride as a catalyst and dimethylsulfoxide as a solvent. In this latter process a mixture of the reactant and the product is recovered from the reaction solution by extraction with chloroform and evaporation of the chloroform, or by precipitation with acid and filtration.

What is needed is a process for hydroxyalkylation of polysaccharides in which polyalkoxylation is avoided. A process in which the polysaccharide is not digested by contact with acid is desirable. A process in which the hydroxyalkylated polysaccharide can be easily separated from the reaction mixture is also desirable.

SUMMARY OF THE INVENTION

The invention is a process for the Z-hydroxyalkylation of a polysaccharide which comprises contacting a polysaccharide with an alkylene carbonate in the presence of a catalytic amount of a quaternary ammonium halide under conditions such that the polysaccharide undergoes hydroxyalkylation.

Another aspect of this invention is a process for the hydroxyalkylation of a substituted polysaccharide which comprises (a) contacting a substituted polysaccharide with an alkylene carbonate in the presence of a catalytic amount of a quaternary ammonium halide; and (b) thereafter contacting the reaction mixture with an aqueous solution of base under conditions such that a hydroxyalkylated substituted polysaccharide is prepared.

Advantageously, this process does not result in polyalkoxylation of the polysaccharides. No acid digestion is required prior to the hydroxyalkylation. Furthermore, there is no solvent required in this reaction, as the polysaccharide is dispersed in alkylene carbonate. This allows separation of the product from the alkylene carbonate by simple filtration. Hydroxyalkylation of polysaccharides increases the water-solubility of polysaccharides.

DETAILED DESCRIPTION OF THE INVENTION

Any polysaccharide which is susceptible to hydroxyalkylation is suitable for this reaction. In general, polysaccharides useful in this process include any polymers of simple sugars (monosaccharides), for example, starches and cellulose compounds. Polysaccharides useful in this invention include those described in Hendrickson et al., *Organic Chemistry*, 3d Ed., pp. 989–994, McGraw-Hill, Inc. (New York), 1970 (incorporated herein by reference).

Polysaccharides useful in this process include those which contain repeating units corresponding to the formula

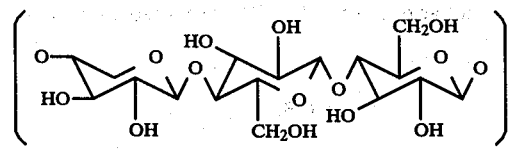

Polysaccharides useful in this process include substituted polysaccharides such as substituted starches and substituted cellulose, for example, methyl-substituted cellulose and ethyl-substituted cellulose.

Alkylene carbonates useful in this invention include those which correspond to the formula

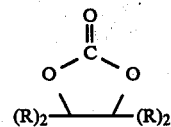

wherein $(R)_2$ is separately in each occurrence hydrogen, $C_{1-20}$ hydrocarbyl or $C_{1-20}$ hydrocarbyl-substituted, with one or more of the following: a halo, hydroxyl, cyano, nitro, thioalkyl, alkoxy, aryloxy, aralkoxy, carbonyldioxyalkyl, carbonyldioxyaryl, carbonyldioxyaralkyl, alkoxycarbonyl, aryloxycarbonyl, alkylcarbonyl, arylcarbonyl, aralkylcarbonyl, alkylsulfinyl, arylsulfinyl, aralkylsulfinyl, alkylsulfonyl, arylsulfonyl or aralkylsulfonyl group.

R is preferably hydrogen, a $C_{1-20}$ alkyl, a $C_{1-20}$ alkenyl or a $C_{1-20}$ haloalkyl group; more preferably hydrogen, a $C_{1-3}$ alkyl, a $C_{1-3}$ haloalkyl or a $C_{1-3}$ alkenyl group; even more preferably hydrogen or methyl; and most preferably hydrogen.

Preferable alkylene carbonates include ethylene carbonate, propylene carbonate, butylene carbonate, vinylene carbonate and phenylene carbonate. More preferred are ethylene carbonate and propylene carbonate, with ethylene carbonate being most preferred.

If the polysaccharide is unsubstituted, it is hydroxyalkylated at the 2 position. The following formula demonstrates the common numbering system for a saccharide unit

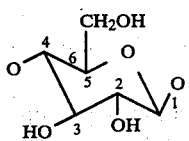

Such products contain saccharide units which correspond to the formula

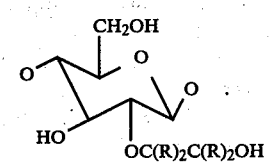

In the embodiment wherein the polysaccharide is substituted, generally the substituent is on the oxygen attached to the 2 carbon. The product of the reaction with alkylene carbonate in the presence of a quaternary ammonium halide is a cross-linked polysaccharide. The polysaccharides are linked by carbonate ether units

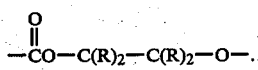

The carbonate moiety reacts with the hydroxyl on one saccharide unit, while the ether portion reacts with a hydroxyl unit on another saccharide unit. The cross-linking of two saccharide units can be represented by the following formula

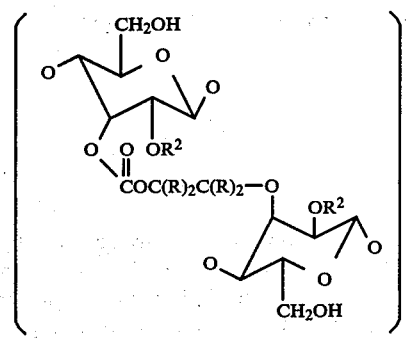

wherein R is as defined above and $R^2$ is a $C_{1-20}$ hydrocarbyl group. $R^2$ is preferably $C_{1-10}$ alkyl, most preferably methyl or ethyl. The cross-linked product can be converted to the 4-hydroxyalkyl polysaccharide by treatment with base as will be described hereinafter.

In the process of this invention, the polysaccharides are dispersed in the alkylene carbonates. Preferably between 1 and 30 percent by weight of the polysaccharides are dispersed in between 70 and 99 weight percent alkylene carbonate, with between about 5 and 15 weight percent of polysaccharide in between about 85 to 95 weight percent of an alkylene carbonate being most preferred.

The catalysts for this reaction are quaternary ammonium halides. Preferred catalysts are tetraalkylammonium halides. Preferred halides are chlorides and bromides. Examples of preferred tetraalkylammonium halides include tetramethylammonium chloride, tetramethylammonium bromide, tetraethylammonium chloride, tetraethylammonium bromide, hexadecyl trimethylammonium chloride, hexadecyl trimethylammonium bromide, tetrabutylammonium bromide, tetrabutylammonium chloride, tetrapropylammonium bromide, tetrapropylammonium chloride, trioctyl methylammonium bromide, trioctyl methylammonium chloride, hexyltriethylammonium bromide, hexyltriethylammonium chloride, octyltriethylammonium bromide, octyltriethylammonium chloride, decyltriethylammonium chloride, decyltriethylammonium bromide, dodecyltriethylammonium chloride, dodecyltriethylammonium bromide, hexadecyltriethylammonium bromide and hexadecyltriethylammonium chloride.

Generally any amount of catalyst which results in catalysis of the reaction described herein is suitable. Preferable amounts of catalyst are between about 0.5 and 10.0 percent by weight of the reactants, with between about 2 and 5 percent by weight being most preferred.

This process can be run at any temperature at which the reaction proceeds. Preferable temperatures are between 80° C. and 140° C. Below 80° C. the reaction rate is extremely slow, above 140° C. decomposition of the reactants and products takes place. More preferable temperatures are between about 110° C. and 140° C.

This process is generally run at atmospheric pressures, although subatmospheric and superatmospheric pressures would be suitable. It may be desirable to run the reaction in an inert gas atmosphere, such as nitrogen or argon, as some of the reactants may be air sensitive.

This process results in the hydroxyalkylation of up to about 40 percent of the saccharide units.

The hydroxyalkylated polysaccharide can be separated from the alkylene carbonate and soluble catalyst by filtration. Residual alkylene carbonate can be removed from the product by washing the product with an alkanol or ketone, such as methanol or acetone.

The alkylene carbonate and catalyst can be recycled once the hydroxyalkylated polysaccharide has been filtered out.

In the embodiment wherein the polysaccharide is substituted, a cross-linked product is prepared by the process described instead of the hydroxyalkylated product. The cross-linking occurs between the hydroxyl moieties on the 4 position of the saccharide units. Such cross-linked products can be converted to hydroxyalkylated polysaccharides by treating them with an aqueous solution of base.

Preferably, the aqueous solution contains at least 5 percent by weight of base, most preferably between 5 and 15 percent by weight of base. Preferable bases include alkali metal hydroxides, alkaline earth metal hydroxides, alkali metal carbonates and alkaline earth metal carbonates. A sufficient amount of the aqueous base solution to decompose the carbonate ether moieties which link the saccharide units is used. Preferably between about 10 and 20, weight percent of the aqueous base solution is used.

Upon treatment with base, the carbon dioxide is evolved. Cessation of evolution of carbon dioxide indicates completion of the reaction. $CO_2$ is eliminated from the carbonate-ether linkage between the saccharide units and the ether unit is retained on the saccharide unit to which it was attached during cross-linking so that such saccharide unit is hydroxyalkylated.

Substituted polysaccharides are generally water-soluble. The cross-linked substituted polysaccharides are water-insoluble and the hydroxyalkylated-substituted polysaccharides are water-soluble.

The conversion of cross-linked polysaccharides to hydroxyalkylated polysaccharides can be done at any temperature at which the reaction proceeds. Preferable temperatures are between about 40° C. and 80° C., preferably between 50° C. and 60° C.

SPECIFIC EMBODIMENTS

The following examples are included for the purpose of illustrating the invention and do not limit the scope of the invention and claims. All parts and percentages are by weight unless specified otherwise.

EXPERIMENTAL PROCEDURE

To a three-neck round-bottom flask is added 5 g of Douglas Pearl ® corn starch, 50 g of ethylene carbonate and 2.75 g of tetraethylammonium bromide (5 percent load by weight). The reagents are stirred under nitrogen for three hours at elevated temperatures. Upon completion of the reaction, the starch is removed from the ethylene carbonate by filtration, the solid cake is rinsed with acetone or remove any residual ethylene carbonate and dried. Analysis for degree of substitution is done using a modified Zeisel Gas Chromatographic Method. The experiment is run at temperatures of 50° C., 80° C., 100° C. and 140° C. The table demonstrates the degree of substitution after three hours.

TABLE

| Example | Temperature | Degree of Substitution |
|---------|-------------|------------------------|
| 1 | 50° C. | 0 |
| 2 | 80° C. | 0.094 |
| 3 | 100° C. | 0.18 |
| 4 | 140° C. | 0.31 |

The table demonstrates that the degree of hydroxyalkylation increases with temperature. It is further demonstrated that at 50° C., no detectable hydroxyalkylation is detected.

What is claimed is:

1. A process for the 2-hydroxyalkylation of a polysaccharide which comprises contacting a polysaccharide with an alkylene carbonate in the presence of a catalytic amount of a quaternary ammonium halide under conditions such that the polysaccharide undergoes hydroxyalkylation.

2. The process of claim 1 wherein the alkylene carbonate corresponds to the formula

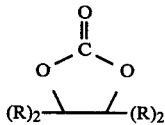

wherein $(R)_2$ is separately in each occurrence hydrogen, $C_{1-20}$ hydrocarbyl or $C_{1-20}$ hydrocarbyl-substituted, with one or more of the following: a halo, hydroxyl, cyano, nitro, thioalkyl, alkoxy, aryloxy, aralkoxy, carbonyldioxyalkyl, carbonyldioxyaryl, carbonyldioxyaralkyl, alkoxycarbonyl, aryloxycarbonyl, alkylcarbonyl, arylcarbonyl, aralkylcarbonyl, alkylsulfinyl, arylsulfinyl, aralkylsulfinyl, alkylsulfonyl, arylsulfonyl or aralkylsulfonyl group.

3. The process of claim 2 wherein R is hydrogen, a $C_{1-20}$ alkyl, a $C_{1-20}$ alkenyl or a $C_{1-20}$ haloalkyl group.

4. The process of claim 2 wherein R is hydrogen, a $C_{1-3}$ alkyl, a $C_{1-3}$ alkenyl or $C_{1-3}$ haloalkyl.

5. The process of claim 2 wherein R is hydrogen or methyl.

6. The process of claim 2 wherein the alkylene carbonate is ethylene carbonate.

7. The process of claim 2 wherein a catalytic amount of quaternary ammonium halide is between about 0.5 and 10.0 weight percent.

8. The process of claim 7 wherein a catalytic amount of quaternary ammonium halide is between 2 and 5 weight percent.

9. The process of claim 7 wherein between about 1 and 30 percent by weight of a polysaccharide is dispersed in an alkylene carbonate.

10. The process of claim 9 wherein between about 5 and 15 percent by weight of polysaccharide is dispersed in an alkylene carbonate.

11. The process of claim 9 wherein the polysaccharide is a starch, a cellulose, a substituted starch or a substituted cellulose.

12. The process of claim 11 wherein the quaternary ammonium halide is a tetraalkylammonium halide.

13. The process of claim 12 wherein the tetraalkylammonium halide is a tetraalkylammonium chloride or tetraalkylammonium bromide.

14. The process of claim 12 wherein the polysaccharide is contacted with the alkylene carbonate at a temperature of between about 80° C. and 140° C.

15. A process for the hydroxyalkylation of a polysaccharide which comprises
(a) dispersing between 1 and 30 percent by weight of a polysaccharide in an alkylene carbonate; and
(b) contacting the dispersion with between about 0.5 and 10.0 weight percent of a quaternary ammonium halide at a temperature of between about 80° C. and 140° C.;
under conditions such that the polysaccharide undergoes hydroxyalkylation.

16. A process for the hydroxyalkylation of a substituted polysaccharide which comprises
(a) contacting a substituted polysaccharide with an alkylene carbonate in the presence of a catalytic amount of a quaternary ammonium halide; and
(b) thereafter contacting the reaction mixture with an aqueous solution of base under conditions such that a hydroxyalkylated substituted polysaccharide is prepared.

* * * * *